United States Patent
Smith et al.

(10) Patent No.: US 10,899,401 B2
(45) Date of Patent: Jan. 26, 2021

(54) YAW ALIGNMENT SYSTEM

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

(*) Notice: Subject to any disclaimer, the term of this patent is extended or adjusted under 35 U.S.C. 154(b) by 251 days.

(21) Appl. No.: 15/886,646

(22) Filed: Feb. 1, 2018

(65) Prior Publication Data
US 2018/0346041 A1 Dec. 6, 2018

Related U.S. Application Data

(60) Provisional application No. 62/515,073, filed on Jun. 5, 2017.

(51) Int. Cl.
*B62D 3/02* (2006.01)
*B62D 57/02* (2006.01)
*B62D 63/02* (2006.01)
*B62D 51/06* (2006.01)
(Continued)

(52) U.S. Cl.
CPC ............... *B62D 57/02* (2013.01); *B60P 1/00* (2013.01); *B62D 3/02* (2013.01); *B62D 51/06* (2013.01); *B62D 63/02* (2013.01); *B62D 57/022* (2013.01); *B62D 57/032* (2013.01)

(58) Field of Classification Search
CPC ........ B62D 57/02; B62D 57/022; B62D 3/02; B62D 51/06; B62D 57/032; B60P 1/00
See application file for complete search history.

(56) References Cited

U.S. PATENT DOCUMENTS

| 1,001,299 A | 8/1911 | Page |
| 1,242,635 A | 10/1917 | Anderson |
| 1,289,207 A | 12/1918 | Leach |

(Continued)

FOREIGN PATENT DOCUMENTS

| CA | 2871406 | 11/2014 |
| CA | 2798743 | 8/2015 |

(Continued)

OTHER PUBLICATIONS

Airstream Inc., "Airstream's New Dura-Torque Axle" Pamphlet.
(Continued)

*Primary Examiner* — Kevin Hurley
*Assistant Examiner* — Marlon A Arce
(74) *Attorney, Agent, or Firm* — Schwabe Williamson & Wyatt

(57) ABSTRACT

An alignment assembly is coupled between a steering assembly and a support foot to maintain an alignment of the support foot with the load transport assembly while the steering mechanism rotates in different steering directions. A biasing device activates in response to non-linear displacements of the load transport assembly relative to the support foot and moves the steering assembly and the support foot back into original alignments with the load transport assembly. The alignment assembly may include a lower main gear assembly that rotates the support foot relative to the steering assembly and an upper main gear assembly that rotates the steering assembly relative to the load transport assembly.

25 Claims, 18 Drawing Sheets

(51) Int. Cl.
  *B60P 1/00* (2006.01)
  *B62D 57/032* (2006.01)

(56) References Cited

U.S. PATENT DOCUMENTS

| | | |
|---|---|---|
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B2 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,544,853 B2 * | 10/2013 | Kanaoka ............... B62D 57/032 180/8.1 |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |
| 9,415,819 B2 * | 8/2016 | Vogt ..................... E21B 15/003 |
| 9,463,833 B2 | 10/2016 | Smith et al. |
| 9,533,723 B2 | 1/2017 | Smith et al. |
| 9,751,578 B2 | 9/2017 | Smith |
| 9,862,437 B2 | 1/2018 | Smith et al. |
| RE46,723 E | 2/2018 | Smith et al. |
| 9,938,737 B1 | 4/2018 | Garceau |
| 2002/0175319 A1 | 11/2002 | Green |
| 2004/0211598 A1 | 10/2004 | Palidis |
| 2004/0240973 A1 | 12/2004 | Andrews |
| 2006/0027373 A1 | 2/2006 | Carriere |
| 2006/0213653 A1 | 9/2006 | Cunningham |
| 2009/0000218 A1 | 1/2009 | Lee |
| 2009/0188677 A1 | 7/2009 | Ditta |
| 2009/0200856 A1 | 8/2009 | Chehade |
| 2009/0283324 A1 | 11/2009 | Konduc |
| 2010/0224841 A1 | 9/2010 | Liljedahl |

(56) References Cited

U.S. PATENT DOCUMENTS

| | | |
|---|---|---|
| 2010/0252395 A1 | 10/2010 | Lehtonen |
| 2011/0072737 A1 | 3/2011 | Wasterval |
| 2011/0114386 A1 | 5/2011 | Souchek |
| 2012/0219242 A1 | 8/2012 | Stoik |
| 2013/0153309 A1 | 6/2013 | Smith et al. |
| 2013/0156538 A1 | 6/2013 | Smith et al. |
| 2013/0156539 A1 | 6/2013 | Smith et al. |
| 2013/0240300 A1 | 9/2013 | Fagan |
| 2013/0277124 A1 | 10/2013 | Smith et al. |
| 2014/0014417 A1 | 1/2014 | Smith et al. |
| 2014/0054097 A1 | 2/2014 | Bryant |
| 2014/0158342 A1 | 6/2014 | Smith |
| 2014/0161581 A1 | 6/2014 | Smith et al. |
| 2014/0262562 A1 | 9/2014 | Eldib |
| 2014/0299564 A1 | 10/2014 | Lin |
| 2015/0053426 A1 | 2/2015 | Smith et al. |
| 2015/0125252 A1 | 5/2015 | Berzen |
| 2015/0166134 A1 | 6/2015 | Trevithick |
| 2015/0166313 A1 | 6/2015 | Knapp |
| 2015/0239580 A1 | 8/2015 | Valenzuela |
| 2016/0023647 A1 | 1/2016 | Saunders |
| 2016/0176255 A1 | 6/2016 | Guiboche |
| 2016/0221620 A1 | 8/2016 | Smith |
| 2016/0297488 A1 | 10/2016 | Smith |
| 2017/0021880 A1 | 1/2017 | Smith |
| 2017/0022765 A1 | 1/2017 | Csergei |
| 2017/0101144 A1 | 4/2017 | Higginbotham, II |
| 2017/0327166 A1* | 11/2017 | Smith .................. E21B 15/003 |
| 2018/0183362 A1 | 6/2018 | Jenner |
| 2018/0072543 A1 | 9/2018 | Rucker |
| 2019/0016575 A1 | 1/2019 | Unger |
| 2019/0048558 A1 | 2/2019 | Unger |
| 2019/0152704 A1* | 5/2019 | Smith .................. B62D 57/032 |

FOREIGN PATENT DOCUMENTS

| | | |
|---|---|---|
| CA | 2798774 | 9/2015 |
| CA | 2798790 | 10/2015 |
| CH | 359422 | 1/1962 |
| CN | 1515477 | 7/2003 |
| CN | 101139069 | 3/2008 |
| CN | 102566573 | 12/2013 |
| CN | 105060161 | 11/2015 |
| CN | 105446271 | 3/2016 |
| CN | 106672113 | 5/2017 |
| CN | 107314000 | 11/2017 |
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Entro Industries, Inc. brochure "The Future of Rig Walkers", Jun. 2012; 4 pages.
Columbia Industries, LLC brochure "Kodiak Cub Rig Walking System", 2009; 4 pages.
Colby, Col. Joseph M., "Torsion-Bar Suspension", SAE Quarterly Transactions, vol. 2, No. 2, pp. 195-200, Apr. 1948.
Airstream Inc., "Airstream's New Dura-Torque Axle" Pamphlet, Jan. 1962.
Schwabe Williamson & Wyatt, PC, "Listing of Related Cases", Aug. 5, 2020, 2 pages.

* cited by examiner

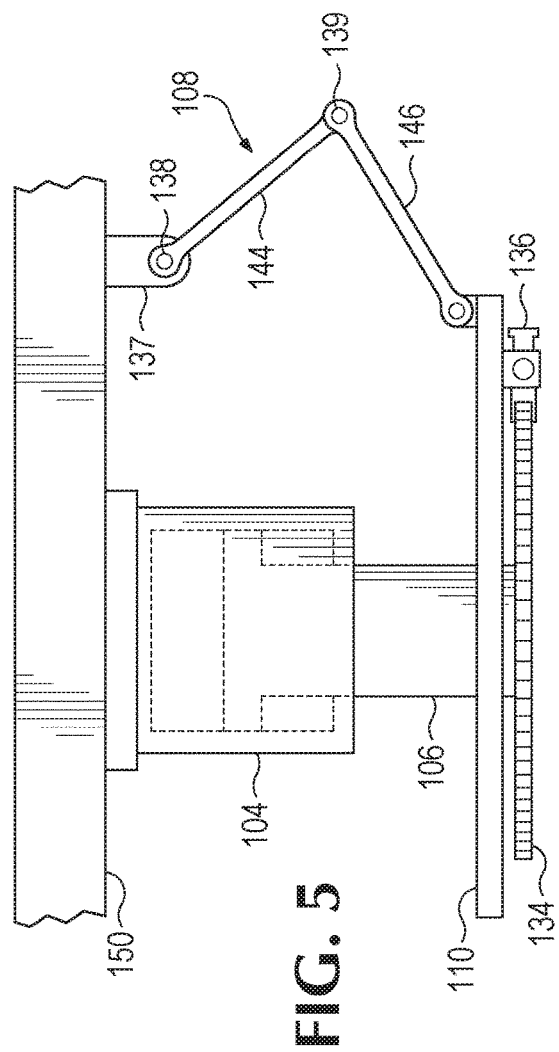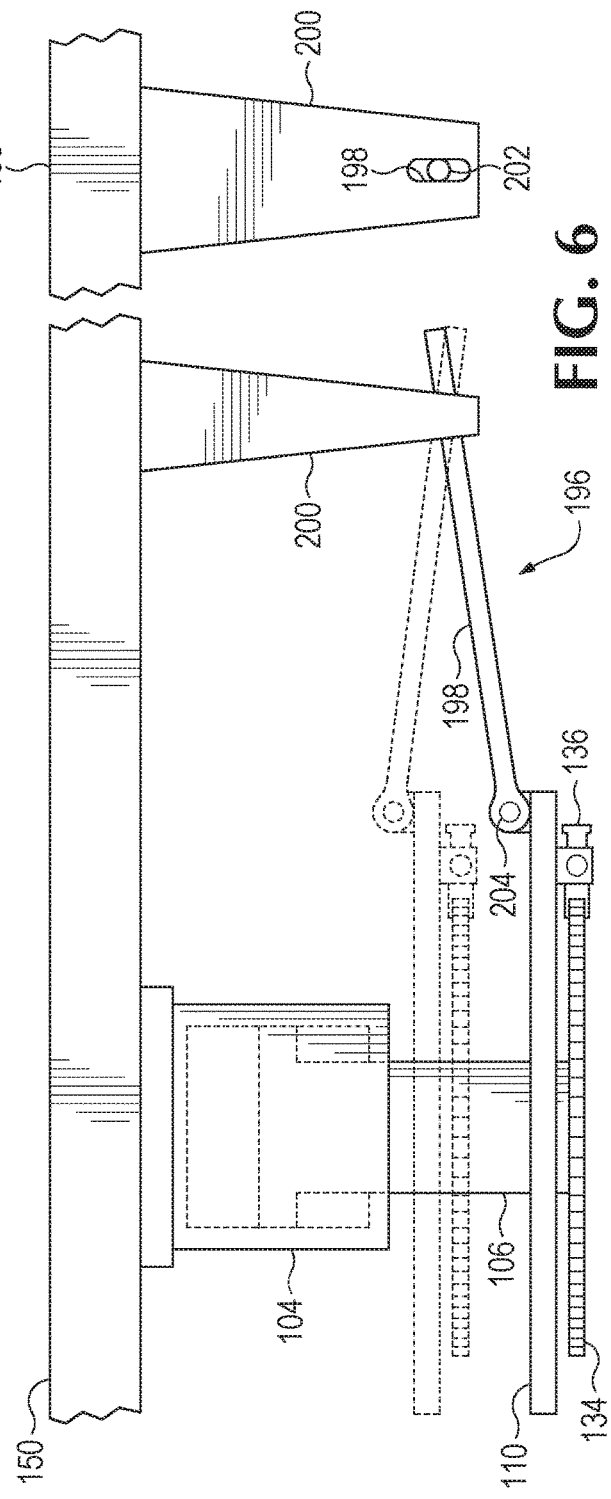

YAW ALIGNMENT SYSTEM

The present application claims priority to U.S. Provisional Patent Application Ser. No. 62/515,073, filed Jun. 5, 2017, entitled: YAW ALIGNMENT SYSTEM, which is incorporated by reference in its entirety.

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

RELATED APPLICATIONS

This application incorporates by reference in their entireties:

U.S. patent application Ser. No. 15/285,366, filed Oct. 4, 2016;
U.S. Pat. No. 9,533,723, issued Jan. 3, 2017;
U.S. Pat. No. 9,096,282, issued Aug. 4, 2015;
U.S. Pat. No. 8,573,334, issued Nov. 5, 2013;
U.S. Pat. No. 8,561,733, issued Oct. 22, 2013;
U.S. Pat. No. 8,490,724, issued Jul. 23, 2013.

FIELD OF THE INVENTION

This disclosure relates generally to apparatuses for transporting a load, and more particularly to a yaw alignment system.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy loads in a direction perpendicular to the long axis of the support beams. That is, movement of the heavy load is restricted in the walking device disclosed in the '525 patent to only particular directions, which can make fine tuning of the position of the heavy load difficult.

SUMMARY

A yaw alignment system aligns a support foot of a walking machine with a load bearing frame when a steering assembly moves a load in different directions.

BRIEF DESCRIPTION OF THE DRAWINGS

FIG. 5 shows a yaw control device that uses scissoring arm members.
FIG. 6 shows a yaw control device that uses a draw bar.

DETAILED DESCRIPTION

As described above, walkers, or walking machines, are vehicles that transport very heavy loads, such as entire oil well drilling rigs. Such loads may be as great as several thousand tons and may need to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load.

The terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
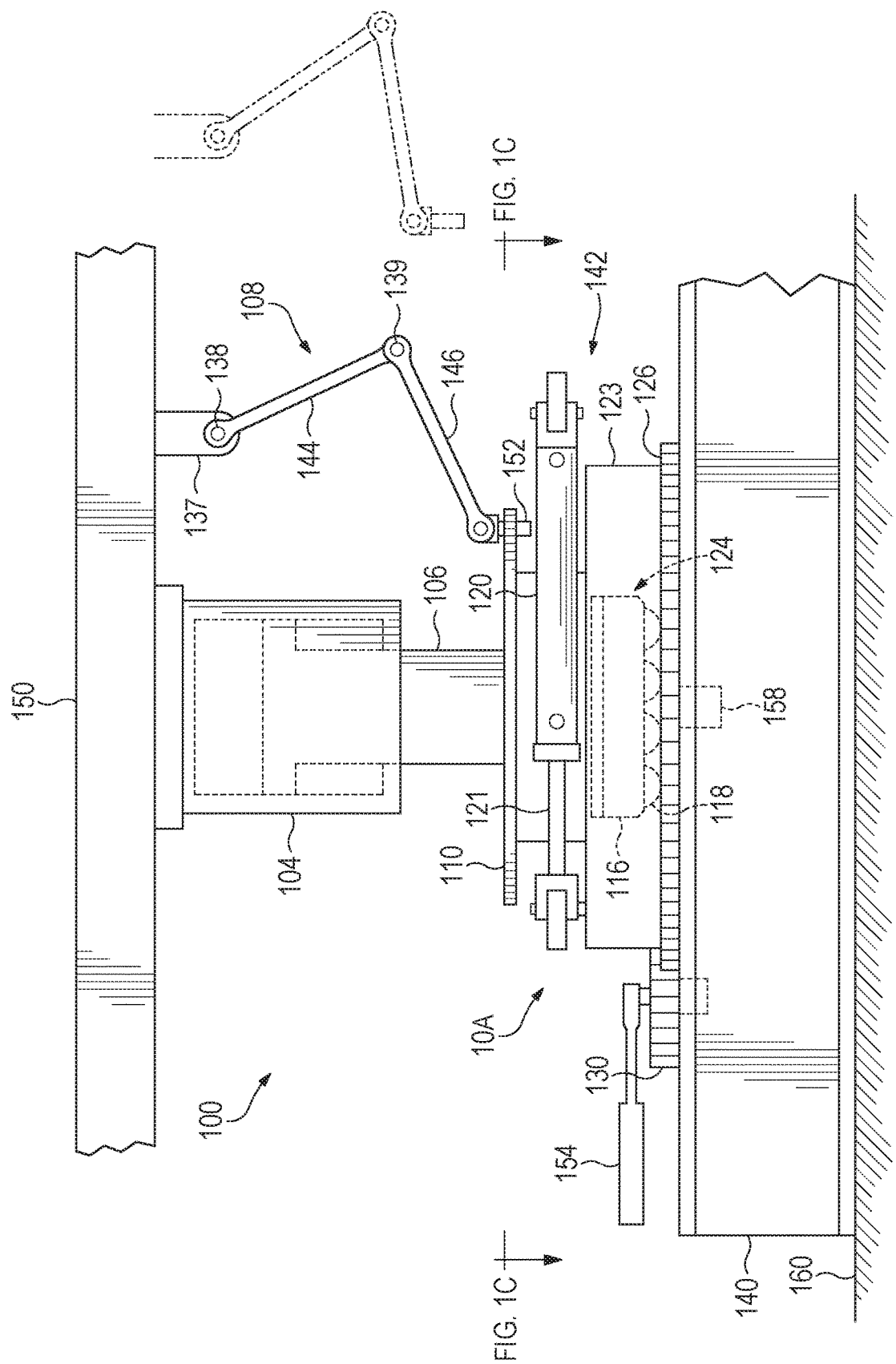
FIG. 1A is a side view of a walking apparatus that includes a manual yaw alignment system.
Figure 1B:
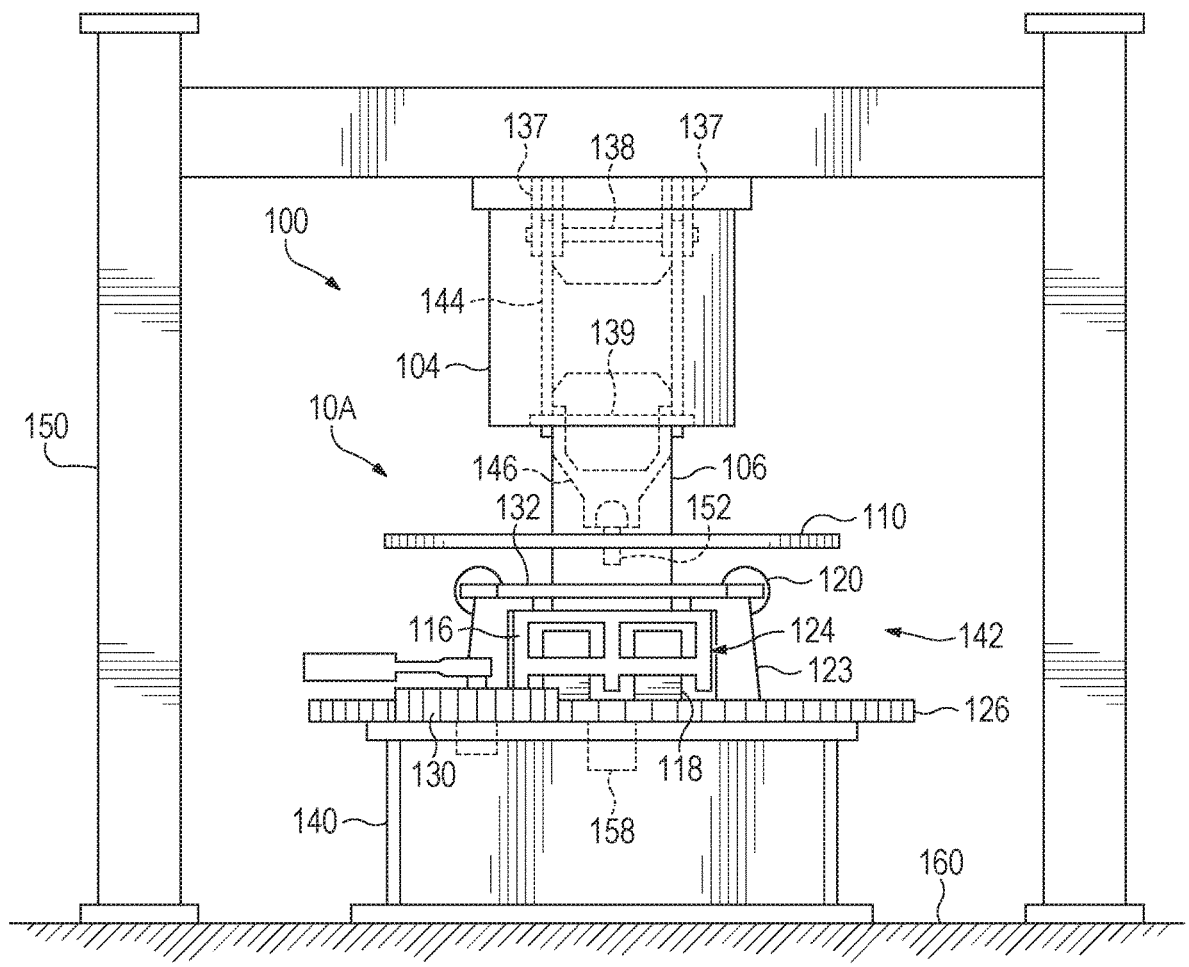
FIG. 1B is an end view of the walking apparatus in FIG. 1A.
Figure 1C:
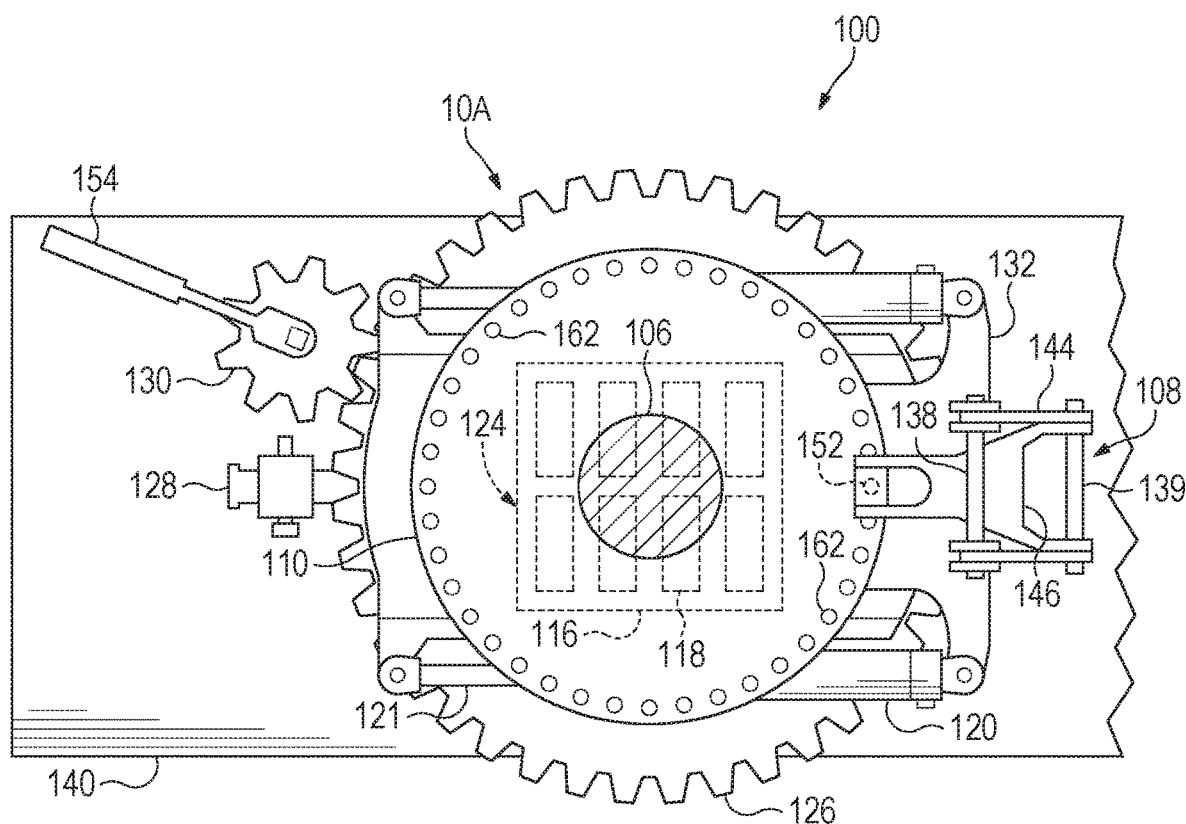
FIG. 1C is a top view of the walking apparatus in FIG. 1A.

FIG. 1A shows a walking apparatus 100 that uses a manual yaw alignment system 10A, FIG. 1B is an end view of the walking apparatus in FIG. 1A, and FIG. 1C is a top view of the walking apparatus in FIG. 1A. Referring to FIGS. 1A, 1B, and 1C, walking apparatus 100 includes a lift cylinder 104 connected to a load bearing frame 150. The load bearing frame is alternatively referred to as a load transport assembly and may include any structure used for carrying and/or transporting a load. There may be multiple walking apparatus 100 located on different corners, ends, or other locations underneath load bearing frame 150.

A lift piston 106 moves vertically up and down inside of lift cylinder 104. A steering assembly 142 is connected between lift piston 106 and a support foot 140. Steering assembly 142 may include a transport assembly 124 that moves inside of a roller track 123. Transport assembly 124 may include a roller frame 116 that retains a set of rollers 118. Travel cylinders 120 and travel cylinder rods 121 are connected between roller track 123 and a bracket 132 connected to lift piston 106.

The bottom end of lift piston 106 may be connected to the top of roller frame 116 and may lift steering assembly 142 and support foot 140 vertically up and down. In the raised position, lift cylinder rod 106 may lift support foot 140 off ground surface 160. In the lowered position, lift piston 106 may press support foot 140 down against ground surface 160 and lift load bearing frame 150 up off of ground surface 160. With load bearing frame 150 in the raised position, travel pistons 121 may retract into travel cylinder 120 and move transport assembly 124, lift piston 106, load bearing frame 150, and any load on frame 150 relative to support foot 140.

A spherical joint may connect cylinder piston rod 106 to transport assembly 124. The spherical joint may allow piston rod 106 to rotate in different horizontal and vertical directions relative to transport assembly 124. In another example, the coupling joint between piston rod 106 and transport assembly 124 may only allow support foot 140 to rotate horizontally about a vertical axis relative to the cylinder assembly. Example connections between piston rod 106 and transport assembly 124 are described in more detail below.

After moving load bearing frame 150 during a step operation, lift piston 106 may retract up into lift cylinder 104 lowering load bearing frame 150 back onto ground surface 160 and lifting steering assembly 142 and support foot 140 up off of ground surface 160. When support foot 140 is raised above ground surface 160, travel cylinder rods 121 may move support foot 140 into an extended position relative to transport assembly 124 and lift piston 106. Walking machine 100 then begins another step operation by lowering support foot 140 down against ground surface 160 and raising load bearing frame 150 up off of the ground surface 160. Travel cylinder rods 121 then retract back into travel cylinder 120 moving transport assembly 124, lift piston 106 and load bearing frame 150 relative to support foot 140 and roller track 123.

Examples of the general operation of walking machine 100 are described in U.S. Pat. Nos. 9,533,723; 9,096,282; 8,573,334, 8,561,733, and 8,490,724, which have been incorporated by reference in their entireties and therefore is not described in further detail.

A rotation device 158 allows steering assembly 142 to rotate around a vertical axis relative to support foot 140. One example rotation device 158 is referred to as a king pin and is described in U.S. Pat. No. 8,573,334 which has been incorporated by reference. Rotation device 158 is just one example, and walking machine 100 may use other rotation devices described below to rotate steering assembly 142 relative to support foot 140.

Rotation of steering assembly 142 may cause support foot 140 to rotate and bump up against the side of load bearing frame 150. Or at the least, support foot 140 may rotate or yaw into a non-aligned longitudinal direction relative to the longitudinal direction of load bearing frame 150. Said another way, rotating steering assembly 142 also may rotate support foot 140 so a longitudinal axis of support foot 140 is no longer parallel with a longitudinal axis of load bearing frame 150.

A manual yaw alignment system 10A moves support foot 140 back into alignment with load bearing frame 150. For example, manual yaw alignment system 10A may rotate the longitudinal axis of support foot 140 back into parallel alignment with the longitudinal axis of load bearing frame 150. Manual yaw alignment system 10A includes a lower main gear 126 rotationally connected to support foot 140 via rotation device 158 and rigidly fixed to the bottom of roller track 123. Yaw alignment system 10A also may include a torque platform 110 rigidly fixed to the top of steering assembly 142.

An operator may hold support foot 140 in a set alignment with load bearing frame 150 while rotating lower pinion gear 130 with steering lever 154. Lower pinion gear 130 rotates or yaws steering assembly 142 and torque platform 110 about a vertical axis while support foot 140 is held in a same alignment with load bearing frame 150. When steering assembly 142 is in the desired rotational direction, the operator may use lower locking mechanism 128 to hold lower main gear 126 and attached steering assembly 142 into a locked yaw alignment with support foot 140.

Yaw alignment system 10 may include a yaw control device 108 attached between load bearing frame 150 and torque platform 110. Yaw control device 108 may include an upper arm 144 attached to load bearing frame 150 and a lower arm 146 attached via a pin 152 to torque platform 110.

Two plates 137 extend down from an upper member of load bearing frame 150. A rod 138 extends through holes formed in the lower end of plates 137 and holes that extend through upper ends of two side members of upper arm 144. Upper arm 144 rotates about rod 138. A second rod 139 extends through concentric holes formed in the bottom of upper arm 144 and the top of lower arm 146.

Upper arm 144 rotates about rods 138 and 139 and lower arm rotates about rod 139 moving in a scissor fashion to extend downwards as shown by the solid line or retract upwards as shown by the dashed lines. After locking lower main gear 126 to support foot 140 with locking mechanism 128, the operator may insert pin 152 into one of holes 162 that extend around the outside edge of torque platform 110.

Yaw control device 108 then realigns support foot 140 with load bearing frame 150 after the step operation. For example, steering assembly 142 may move the load carried on load bearing frame 150 in a non-linear direction creating a yaw misalignment or differential angle between load bearing frame 150 and support foot 140. Said another way, steering assembly 142 may move load bearing frame 150 in a non-parallel direction relative to the longitudinal axis of support foot 140. Yaw control device 108 elastically deforms, twists, and/or bends into a biased state in response to the non-linear movement of load bearing frame 150.

After completion of the step operation, lift cylinder 106 lowers load bearing frame 150 onto ground surface 160 and lifts steering assembly 142 and support foot 140 up off of ground surface 160. Yaw control device 108 elastically releases from the biased state back into a previous unbiased state moving steering assembly 142 and support foot 140 back into the previous alignment relative to load bearing frame 150.

Yaw control device 108 is just one example device that may correct the yaw movement or differential angle misalignment of support foot 140 relative to load bearing frame 150. Other example yaw control devices are described in more detail below.

Figure 2A:
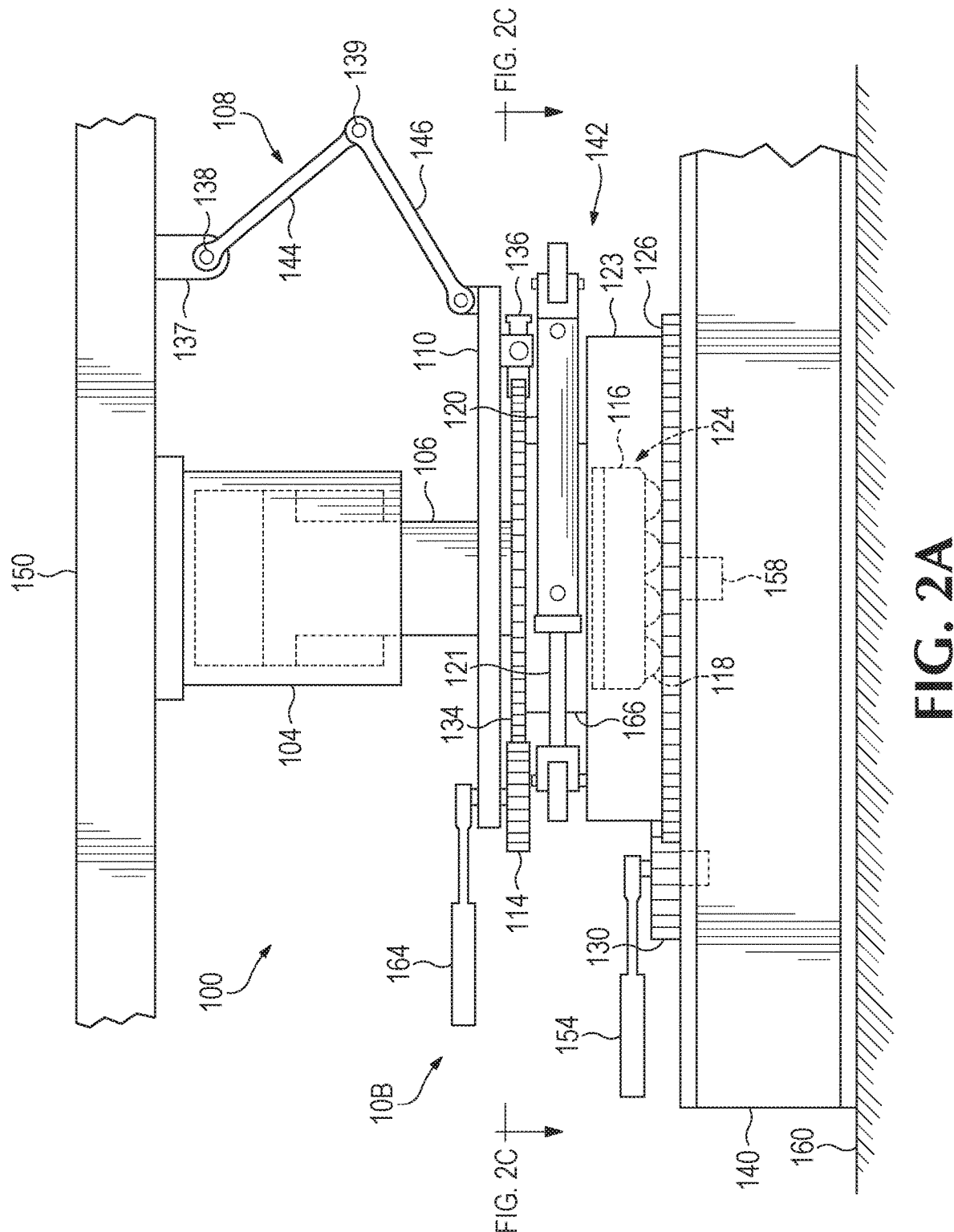
FIG. 2A is a side view of a walking apparatus with a yaw alignment system that includes upper and lower main gears.
Figure 2B:
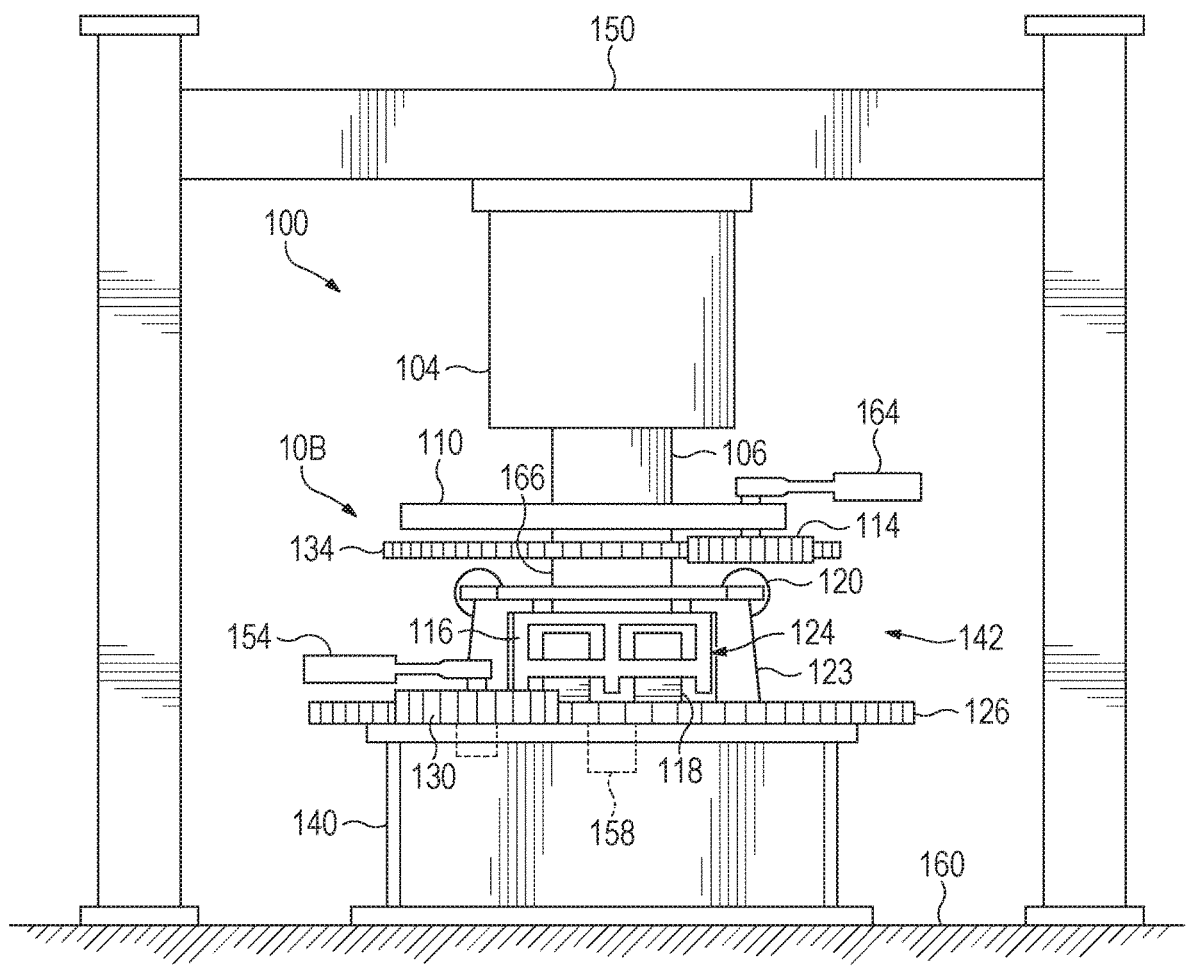
FIG. 2B is an end view of the walking apparatus in FIG. 2A.
Figure 2C:
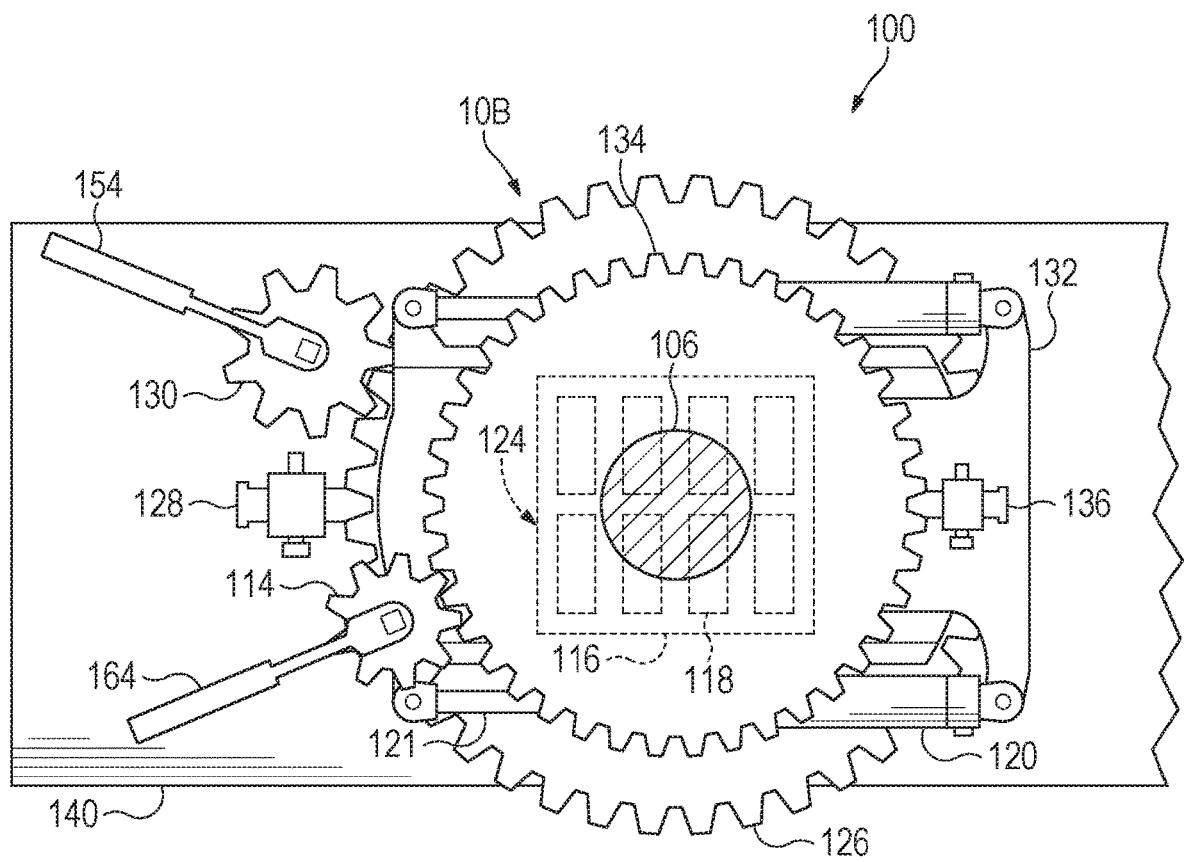
FIG. 2C is a top view of the walking apparatus in FIG. 2A.

FIG. 2A shows a side view of a walking apparatus with a second example yaw alignment system 10B that includes an upper main gear 134, FIG. 2B is an end view of the walking apparatus in FIG. 2A, and FIG. 2C is a top view of the walking apparatus in FIG. 2A. Referring to FIGS. 2A, 2B, and 2C, torque platform 110 is coupled to lift piston 106. An upper main gear 134 is rotationally coupled to torque platform 110 and is rigidly attached to the top of transport assembly 124 via a cylinder 166. A load on load bearing frame 150 is transferred through lift piston 106 and interface connector 166 onto the top of transport assembly 124.

An upper pinion gear 114 is rotationally attached to torque platform 110. An operator may use an upper steering lever 164 to rotate upper pinion gear 114 causing upper main gear 134 to rotate about a vertical axis relative to torque platform 110. Yaw control device 108 may keep torque platform 108 from rotating relative to upper main gear 134. Rotation of upper main gear 134 may rotate steering assembly 142, lower main gear 126, and support foot 140. However, when levers 164 and 154 are operated simultaneously, support foot 140 does not rotate.

To counteract the rotation or yaw of support foot 140 into a non-aligned position relative to load bearing frame 150, the operator may use lower steering lever 154 to rotate lower pinion gear 130. Lower pinion gear 130 may cause support foot 140 to rotate in an opposite direction relative to lower main gear 126, steering assembly 142, and upper main gear 134. The rotation of support foot 140 offsets the rotation of steering assembly 142 and maintains support foot 140 in substantially a same yaw alignment relative to load bearing frame 150.

After steering assembly 142 is rotated to the desired steering position, upper main gear 134 is locked to torque platform 110 with upper locking mechanism 136. After support foot 140 is rotated to maintain the correct alignment relative to load bearing frame 150, support foot 140 is locked to lower main gear 126 with lower locking mechanism 128. At this point, torque platform 110, upper main gear 134, steering assembly 142, lower main gear 126, and support foot 140 are all rotationally locked together.

Lift piston 106 may lower support foot 140 and raise load bearing frame 150 off of ground surface 160. Travel piston 121 may retract into travel cylinder 120 moving load bearing frame 150, and the load on load bearing frame 150, relative to support foot 140. Steering assembly 142 may move a load transported on load bearing frame 150 in a lateral direction relative to the longitudinal axis of support foot 140 creating a yaw or differential angle between support foot 140 and load bearing frame 150. Yaw control device 108 may elastically deform into a biased state from the torque created by the non-linear angular displacement of load bearing frame 150 relative to support foot 140 and steering assembly 142.

After completion of the step operation, lift piston 106 may lower load bearing frame 150 and lift support foot 140 up off of ground surface 160. Biased yaw control device 108 releases back into a non-biased state moving steering assembly 142 and support foot 140 back into their original yaw alignment relative to load bearing frame 150. Travel piston 121 extends back out of travel cylinder 120 while support foot 140 is in the raised position moving support foot 140 and roller track 123 forward relative to transport assembly 124, lift piston 106, and load bearing frame 150.

Figure 3A:
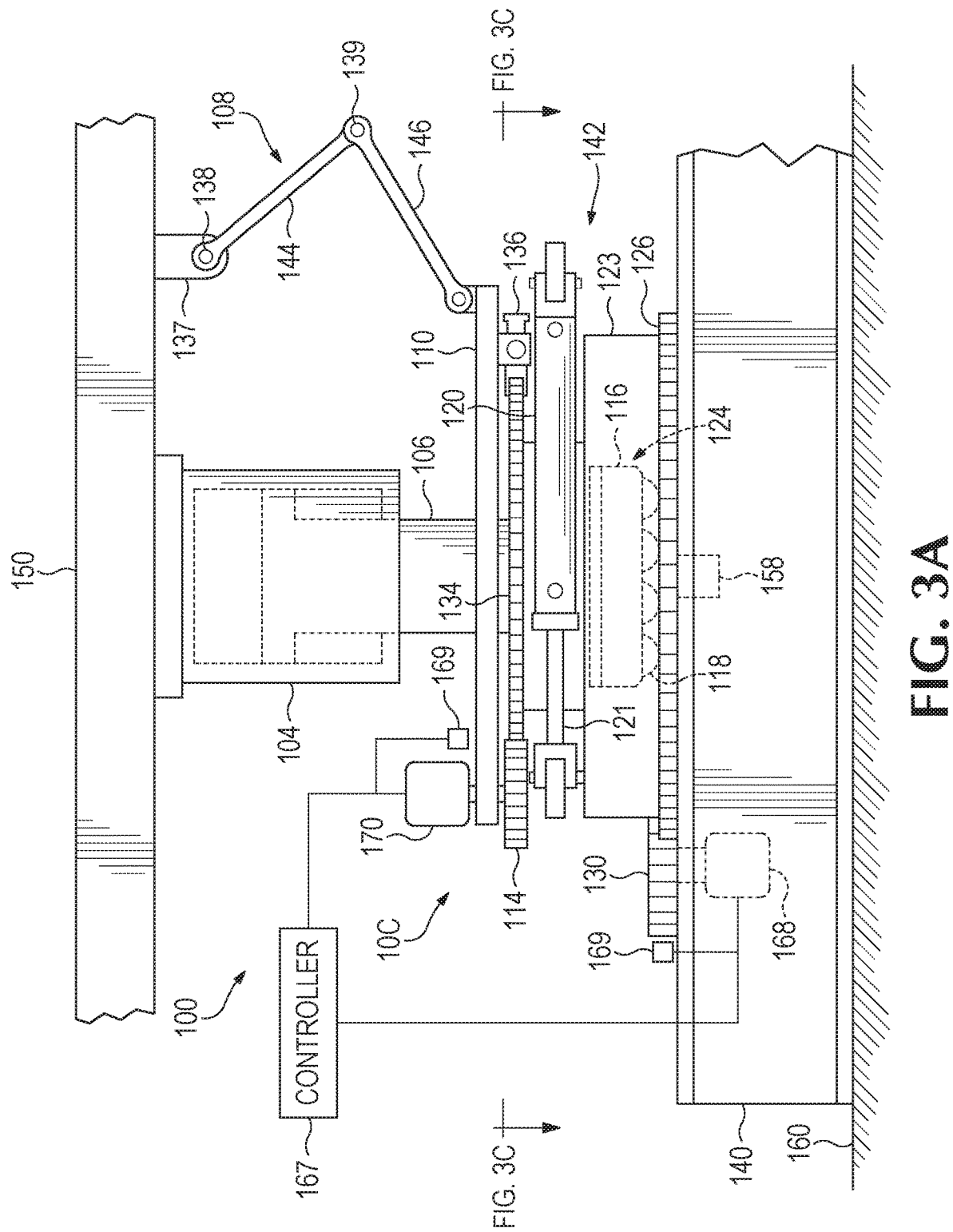
FIG. 3A is a side view of a motorized yaw alignment system.
Figure 3B:
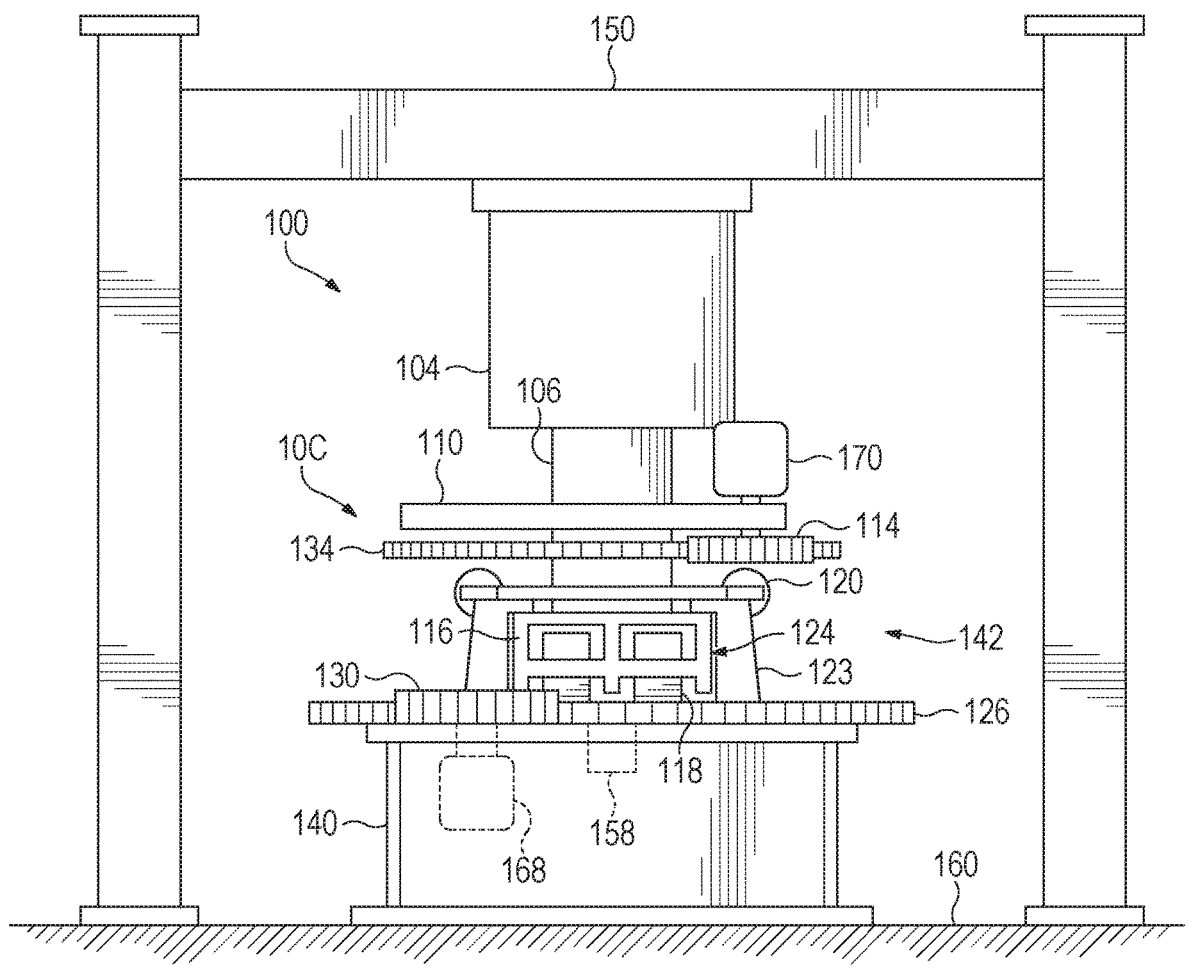
FIG. 3B is an end view of the motorized yaw alignment system in FIG. 3A.
Figure 3C:
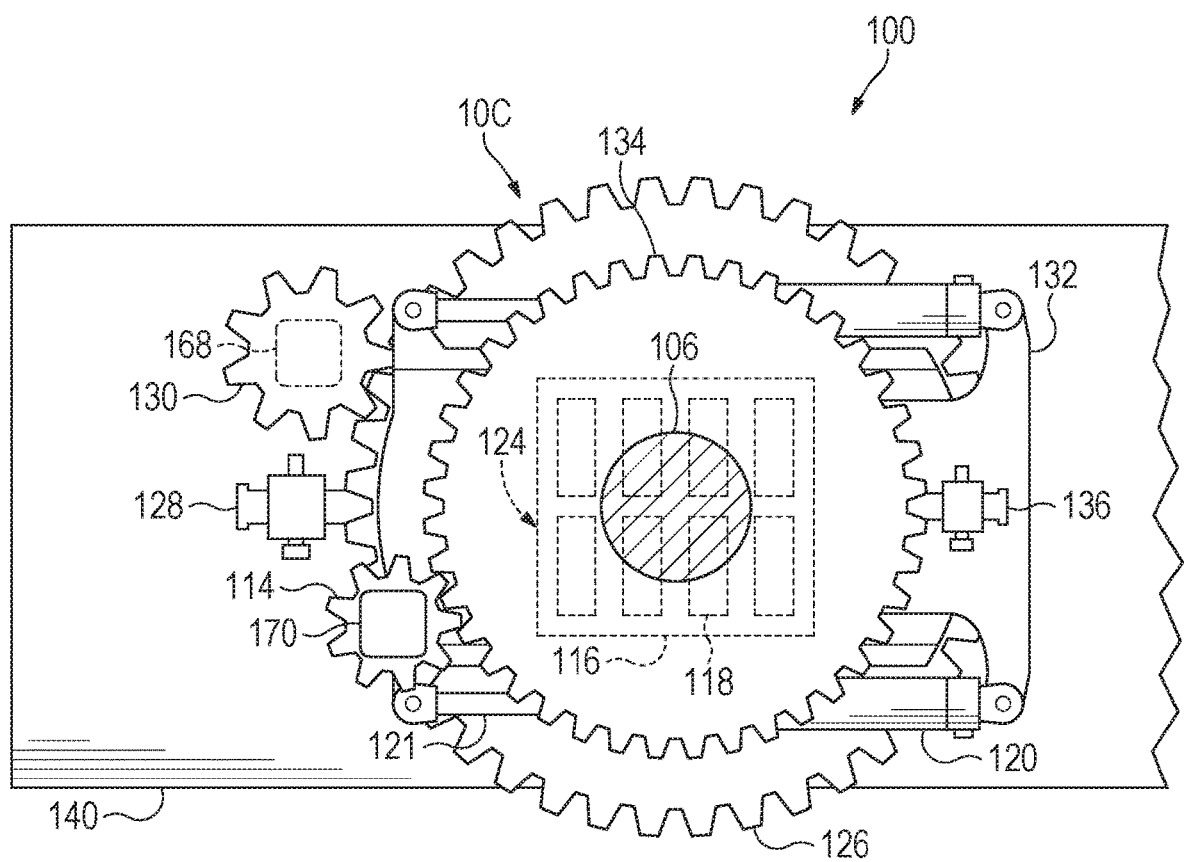
FIG. 3C is a top view of the motorized yaw alignment system in FIG. 3A.
Figure 3D:
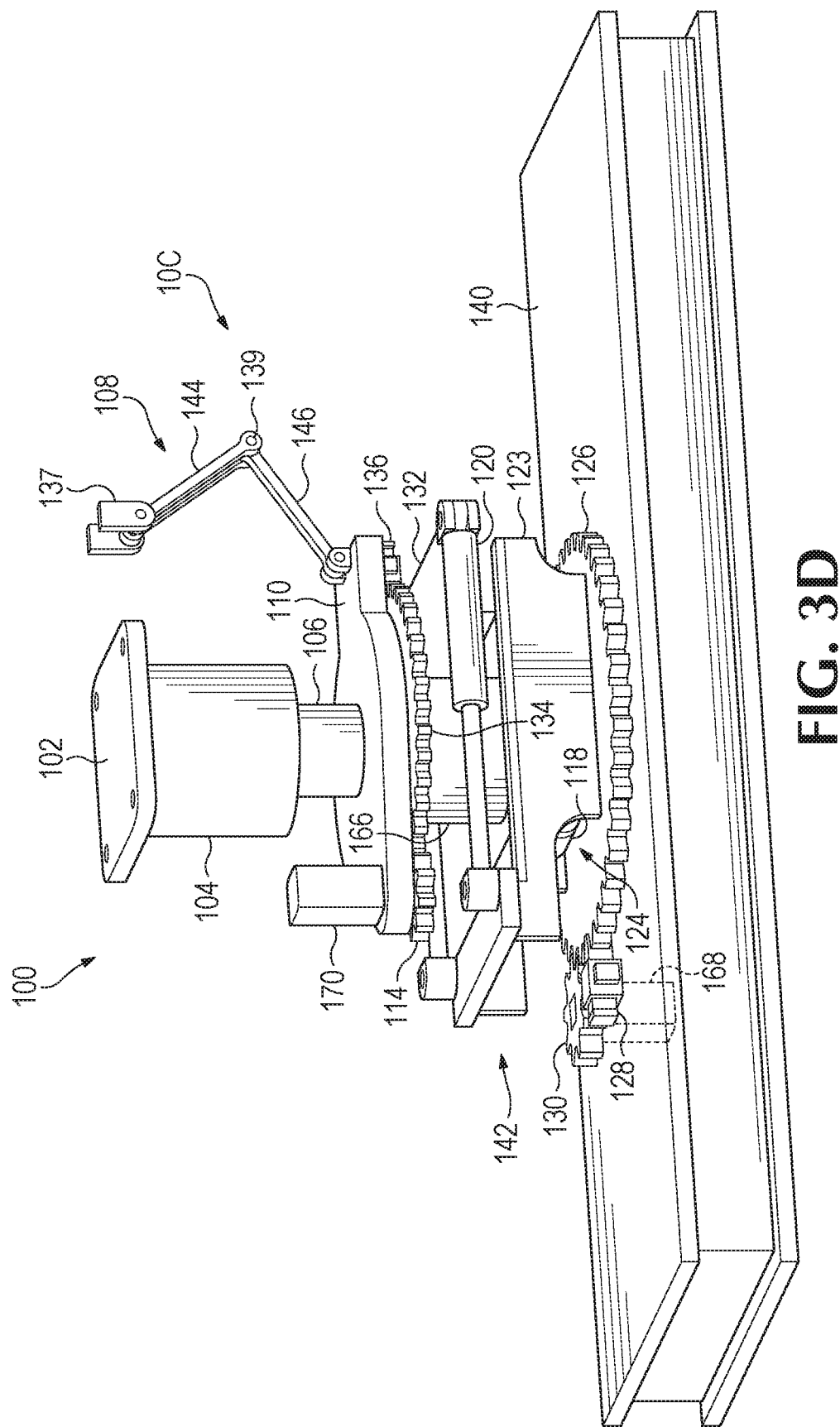
FIG. 3D is a perspective view of the motorized yaw alignment system in FIG. 3A.

FIGS. 3A-3D show an example automated yaw alignment systems 10C. FIG. 3A shows a side view of a first automated yaw alignment system, FIG. 3B is an end view of the yaw alignment system in FIG. 3A, FIG. 3C is a top view of the yaw alignment system in FIG. 3A, and FIG. 3D is a perspective view of the yaw alignment system in FIG. 3A.

Referring to FIGS. 3A, 3B, 3C, and 3D, as described above, lift piston 106 moves vertically up and down inside of lift cylinder 104 that is coupled via a plate 102 to the load transport assembly. As also described above, steering assembly 142 is connected between lift piston 106 and a support foot 140 and may include a transport assembly 124 that moves inside of a roller track 123. Transport assembly 124 may include a set of rollers 118. Travel cylinders 120 are connected between roller track 123 and a bracket 132 connected to transport assembly 124.

Yaw alignment system 10C may include a torque platform 110, upper main gear 134, and lower main gear 126 similar to those described above in FIGS. 2A-2C. Yaw alignment system 10C also may include an upper pinion gear 114, upper locking mechanism 136, lower pinion gear 130, and lower locking mechanism 128 similar to those shown in FIG. 2.

Instead of using manual levers, an upper motor 170 is connected to and rotates upper pinion gear 114 and a lower motor 168 is connected to and rotates lower pinion gear 130. In another example, motor 168 may be located on top of lower pinion gear 130. A motor controller 167 may control operation of motors 170 and 169. In one example, motor controller 167 may include a central processing unit (CPU) and memory storing a set of computer instructions that are executed by the CPU to control the yaw of steering assembly 142 and support foot 140.

Upper locking mechanism 136 and lower locking mechanism 128 may be unlocked from upper main gear 134 and lower main gear 126, respectfully. While support foot 140 is in the raised position, controller 167 may cause motor 170 to rotate steering assembly 142 into a desired position relative to load bearing frame 150. For example, upper motor 170 may rotate upper pinion gear 114 causing upper main gear 134 and attached steering assembly 142 to rotate in either a clockwise or counter-clockwise direction about a vertical axis.

At the same time, controller 167 may cause lower motor 168 to rotate lower pinion gear 130 rotating support foot 140 in an equal and opposite rotational direction relative to steering assembly 142. For example, if upper motor 170 rotates steering assembly 142, controller 167 may cause lower motor 168 to rotate lower pinion gear 130 keeping support foot 140 in substantially the same yaw alignment relative to load bearing frame 150.

Controller 167 does not have to rotate support foot 140 the same amount as steering assembly 142. For example, controller 167 may be coupled to a sensor 169 that monitors the amount of rotation of support foot 140. Controller 167 may cause motor 168 to rotate support foot 140 any amount that maintains sufficient spacing between support foot 140 and load bearing frame 150.

Motors 168 and 170 may be controlled electrically, hydraulically, or with pressurized air. In one example, motors 168 and 170 are hydraulically connected together in series where any rotation by one motor 170 causes a specific amount of rotation by motor 168. Alternatively, controller 167 may monitor sensors 169 the identify the amount of rotation or position of steering assembly 142 and support foot 140.

Any type of mechanical, electrical, or optical sensors 169 may be used for measuring the amount of rotation or rotational position. Controller 167 uses the sensor readings to rotate steering assembly 142 a desired amount and to maintain support foot 140 in a desired alignment with load bearing frame 150. Alternatively, an operator may manually control motors 168 and 170 via a user interface (not shown) coupled to controller 167.

After rotating steering assembly 142 and support foot 140, upper locking mechanism 136 may lock upper main gear 134 to torque platform 110 and lower locking mechanism 128 may lock support foot 140 to lower main gear 126. In other examples, locking mechanisms 136 and 128 are optional. Locking mechanisms 128 and 136 may be manually locked and unlocked, or may be automatically or manually controlled via controller 167 or by any other control system that operates with the walking apparatus.

Yaw control device 108 may be attached to torque platform 110 to realign steering assembly 142 and support foot 140 with load bearing frame 150 after the step operation as described above. Yaw alignment system 10 may allow motors 168 and 170 to slip due to the differential angle created between load bearing frame 150 and support foot 140. Feedback sensors 169 may determine support foot 140 and steering assembly 142 are no longer in a previous position relative to load bearing frame 150. Steering controller 167 then may cause motors 168 and 170 to rotate support foot 140 and steering assembly 142 back to their previous pre-step positions relative to load bearing frame 150.

Figure 4A:
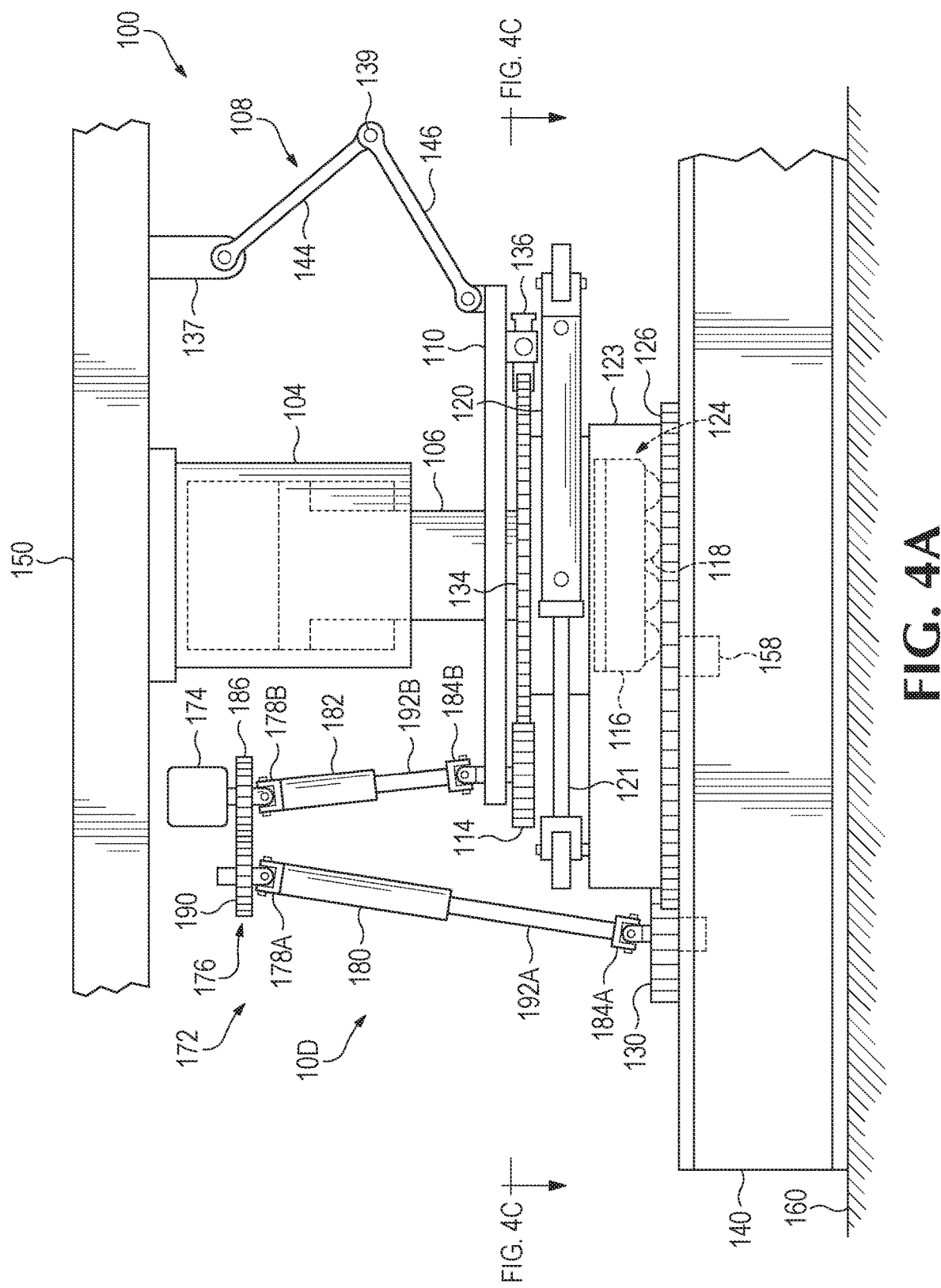
FIG. 4A is a side view of a yaw alignment system that uses a single steering motor.
Figure 4B:
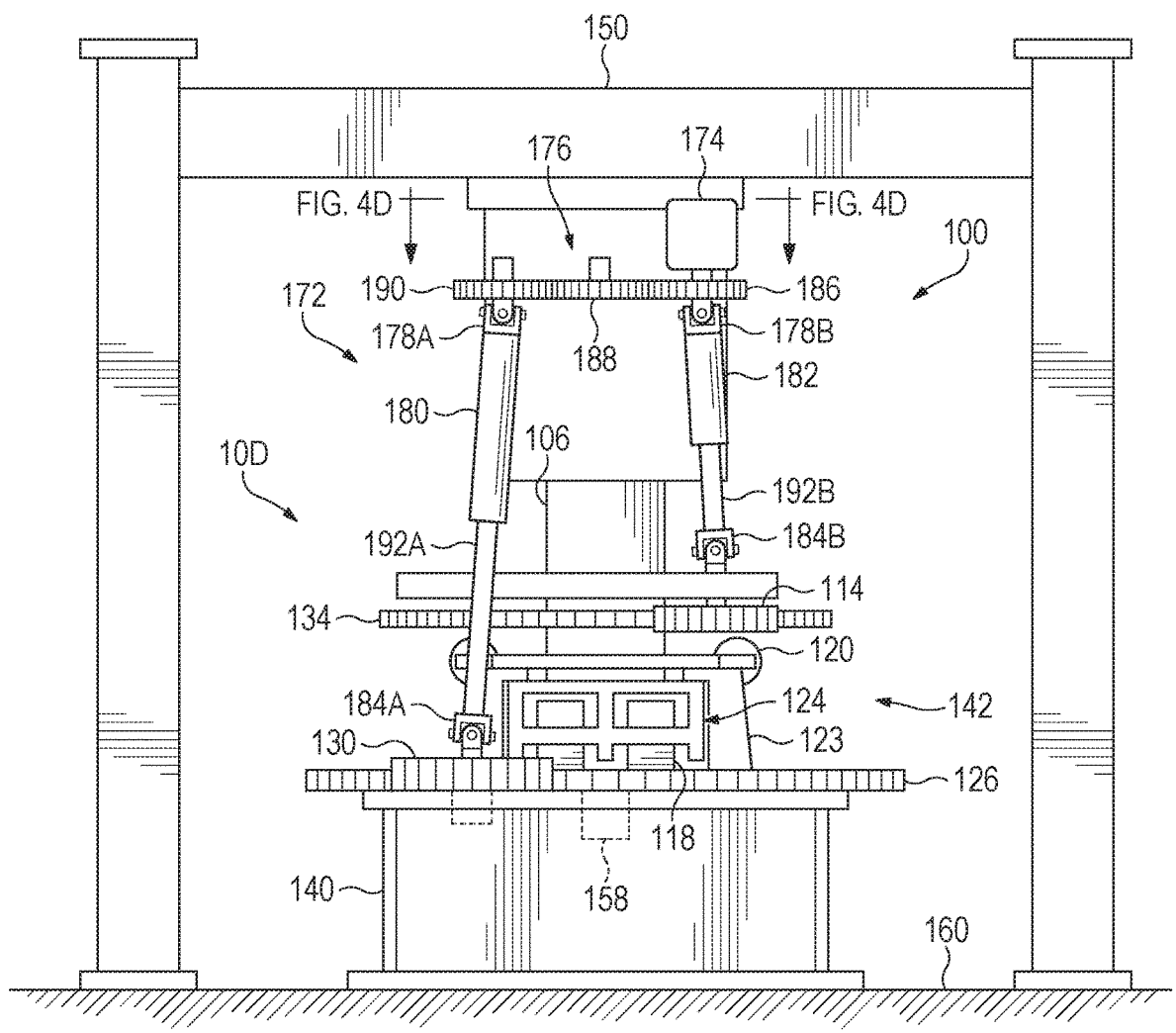
FIG. 4B is an end view of the yaw alignment system in FIG. 4A.
Figure 4C:
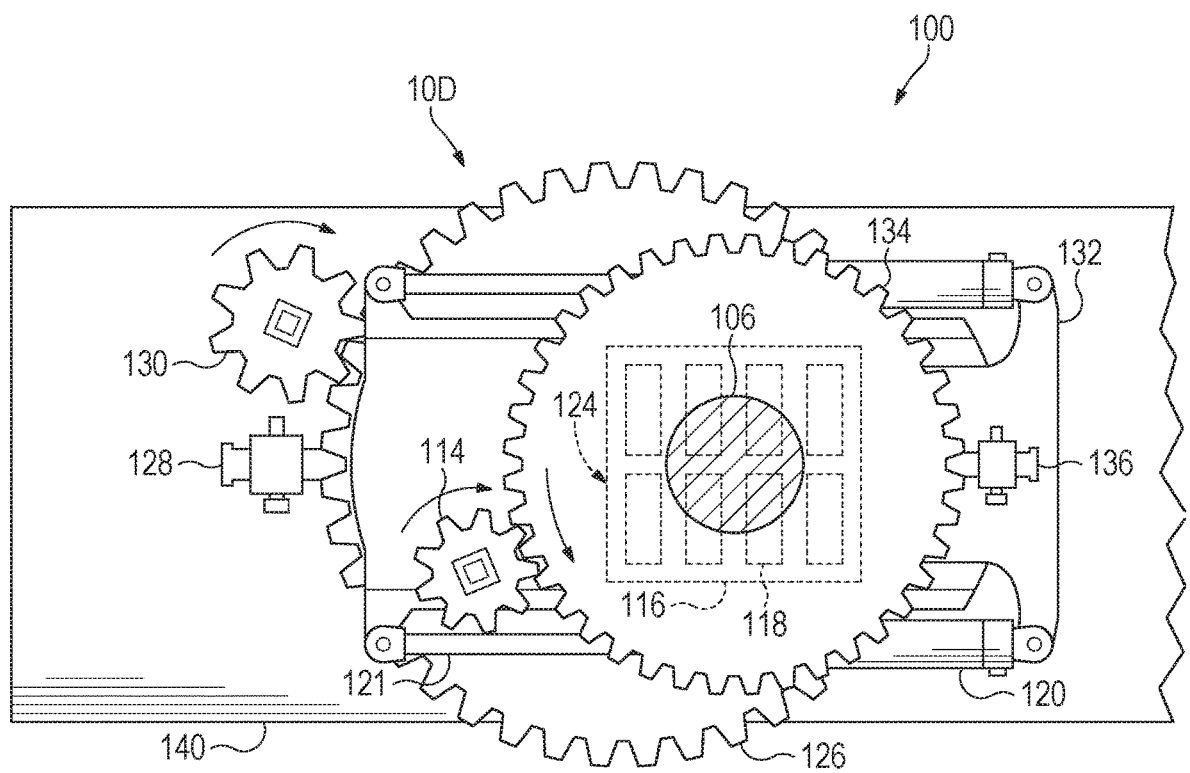
FIG. 4C is a top view of the yaw alignment system in FIG. 4A.
Figure 4D:
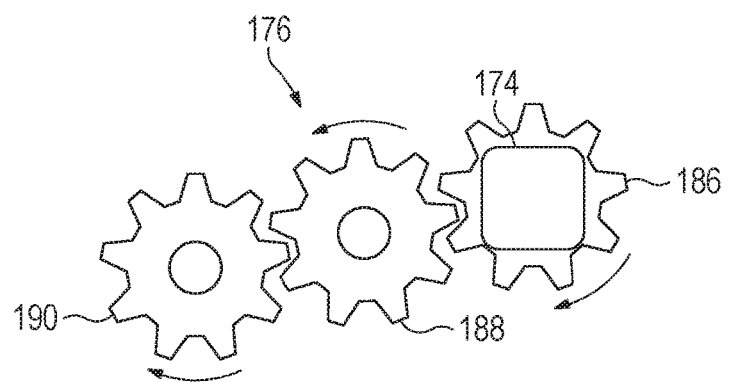
FIG. 4D is an isolated top view of a gear assembly used in the yaw alignment system in FIG. 4A.

FIGS. 4A-4D show another example automated yaw alignment systems 10D. FIG. 4A shows a side view of the automated yaw alignment system, FIG. 4B is an end view of the automated yaw alignment system in FIG. 4A, FIG. 4C is a top view of the yaw alignment system in FIG. 4A, and FIG. 4D is an isolated view of a gear assembly used in the yaw alignment system in FIG. 4A.

Referring to FIGS. 4A, 4B, 4C, and 4D, yaw alignment system 10D includes a splined or telescoping assembly 172. Instead of using upper and lower motors as shown in FIGS. 3A-3D, yaw alignment system 10D uses a single motor 174 to rotate two splined telescoping shafts 180 and 182. Motor 174 is coupled to shafts 180 and 182 through a gear assembly 176. Universal joints 178A and 178B at the top ends of shafts 180 and 182, respectively, are coupled to gears 190 and 186, respectively, in gear assembly 176. Universal joint 184A at the bottom end of shaft 180 is coupled to lower pinion gear 130 and a universal joint 184B at the bottom end of shaft 182 is coupled to upper pinion gear 114.

Shafts 180 and 182 each include extending members 192A and 192B, respectively, that retract upwards when lift piston 106 raises support foot 140 off of ground surface 160 and extend downwards when lift piston 106 lowers support foot 140 down onto ground surface 160. In other examples, torsion springs may be used instead of shape modifying shafts 180 (may include flexible, or telescoping) and 182 or torsion springs may be integrated into shafts 180 and 182.

In one example, gear 186 in gear assembly 176 is coupled to motor 174 and rotationally coupled to gear 190 through a middle gear 188. In another example, a chain may be used instead of middle gear 188 to rotationally couple gear 186 to gear 190. Motor 174 rotates gear 186 rotating shaft 182 and attached upper pinion gear 114. As described above, upper pinion gear 114 rotates upper main gear 134 and attached steering assembly 142 in a first rotational yaw direction relative to torque platform 110 and load bearing frame 150. While shown coupled to gear 186, motor 174 may be coupled anywhere in gear assembly 176 so shafts 180 and 182 can transfer associated torque to turn gears 114 and 130.

Rotation of gear 186, rotates middle gear 188 in an opposite direction that rotates gear 190 in a same direction as gear 186. Gear 190 rotates shaft 180 and lower pinion gear 130 in a same direction as upper pinion gear 114. Lower pinion gear 130 in turn rotates support foot 140 in an opposite rotational yaw direction than steering assembly 142. Support foot 140 maintains a same alignment with loading bearing frame 150 as motor 174 rotates steering assembly 142. Shaft 180 also may extend vertically to accommodate any difference in rotational movement between support foot 140 and steering assembly 142.

Figure 7:
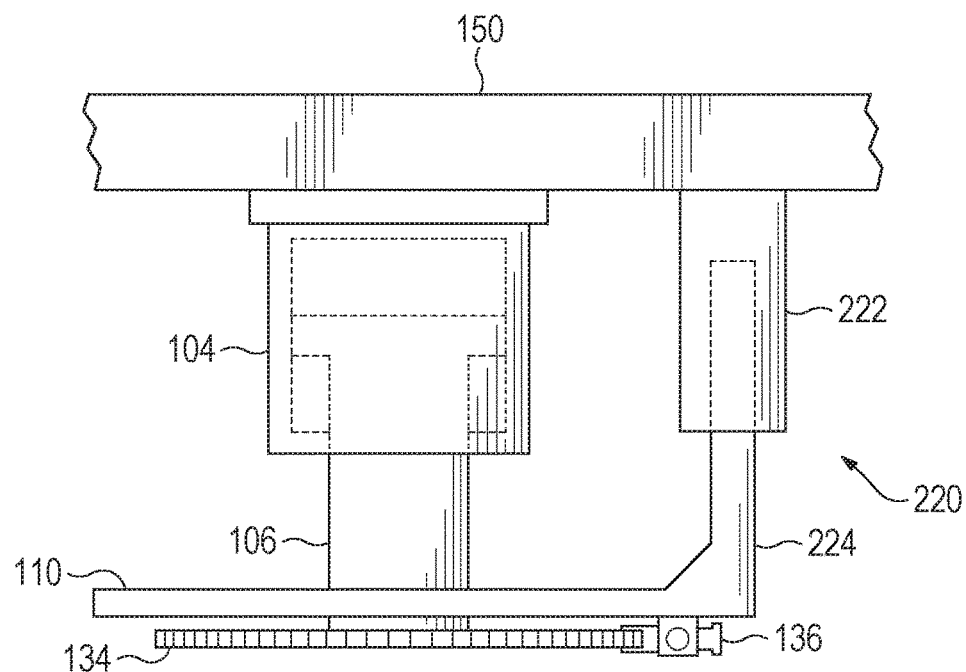
FIG. 7 shows a yaw control device that uses concentric tubes.

FIGS. 5, 6, and 7 are isolated side views of different example yaw control devices. Each yaw control device may extend vertically up and down to move in coordination with the vertical raising and lowering of steering assembly 142 and support foot 140.

Referring first to FIG. 5, yaw control device 108 was described above in FIGS. 1-4 and may include upper arm 144 connected by hinge 139 to lower arm 146. Yaw control device 108 operates in a scissor manner with upper arm 144 and lower arm 146 rotating about hinge 139 toward each other when lift piston 106 lifts torque platform 110 upward toward load bearing frame 150. Upper arm 144 and lower arm 146 rotate downward about hinge 139 away from each other as lift piston 106 moves torque platform 110 downward.

FIG. 6 shows a yaw control device 196 that may include a drawbar 198 with a first end hinged to torque platform 110 and a second end that inserts into a slot 202 formed in a support 200 that extends down from load bearing frame 150. The first end of drawbar 198 rotates upward about hinge 204 and the second end of drawbar 198 rotates downward within slot 202 when lift piston 106 raises torque platform 110. The first end of drawbar 198 rotates downward about hinge 204 and the second end of drawbar 198 rotates upward within slot 202 when lift piston 106 lowers torque platform 110. Drawbar 198 also slides axially within slot 202.

Drawbar 198 also may prevent torque platform 110 from rotating while main upper gear 134 and attached steering assembly 142 are being rotated. Drawbar 198 also may elastically deform into a biased state in response to the yaw displacement created between load bearing frame 150 and support foot 140 when walking machine 100 moves load bearing frame 150 in a non-linear direction. A non-linear direction is alternatively referred to as moving the longitudinal axis of the load bearing frame in a non-linear or lateral direction relative to a longitudinal axis of support foot 140. When support foot 140 is raised, drawbar 198 elastically releases back into an unbiased state rotating steering assembly 142 and support foot 140 back into a pre-step alignment with load bearing frame 150.

FIG. 7 shows a yaw control device 220 including two concentric tubes 222 and 224 that elastically couple load bearing frame 150 to torque platform 110. Tube 222 extends vertically down from load bearing frame 150. A first end of tube 224 concentrically and slidingly inserts into tube 222 and a second end is rigidly attached to torque platform 110. As lift piston 106 moves torque platform 110 downward, tube 224 extends vertically down and partially out of tube 222. As lift piston 106 moves torque platform 110 upward, tube 224 slides partially up into tube 222.

Tubes 222 and 224 may have non-circular cross-sectional shapes. For example, tubes 222 and 224 may have square or triangular cross-sectional shapes. Tube 222 and/or 224 may elastically twist and/or bend into a biased state in response to the differential yaw created between load bearing frame 150 and support foot 140 during a step operation. When support foot 140 is raised, tube 222 and/or 224 elastically untwist and/or bend back into an unbiased state moving steering assembly 142 and support foot 140 back into a pre-step alignment relative to load bearing frame 150.

Other types of biasing members also may be used for holding torque platform 110, elastically connecting load bearing frame 150 with torque platform 110, and realigning steering assembly 142 and support foot 140 with load bearing frame 150.

Figure 8:
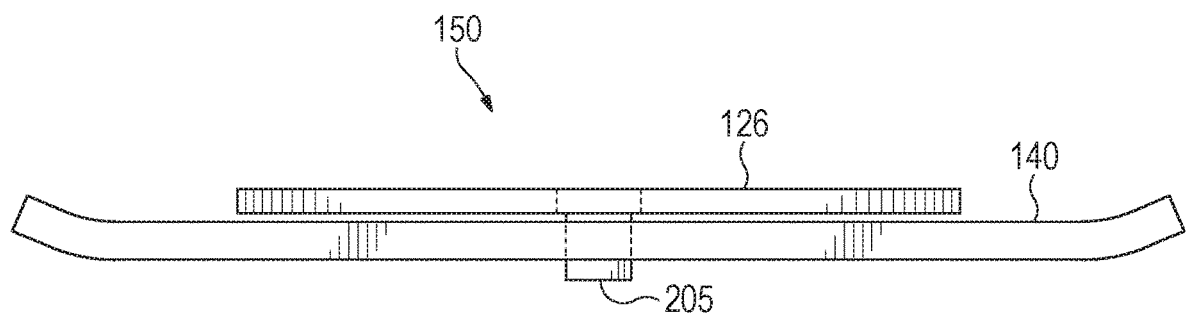
FIG. 8 is a side view of a rotation device that uses a king pin

FIGS. 8-11 show different types of rotation devices that may rotationally couple steering assembly 142 and lower main gear 126 to support foot 140. In one example, rotation device 150 may include a king pin 205 as shown in FIG. 8 and as described in U.S. Pat. No. 8,573,334.

Figure 9A:
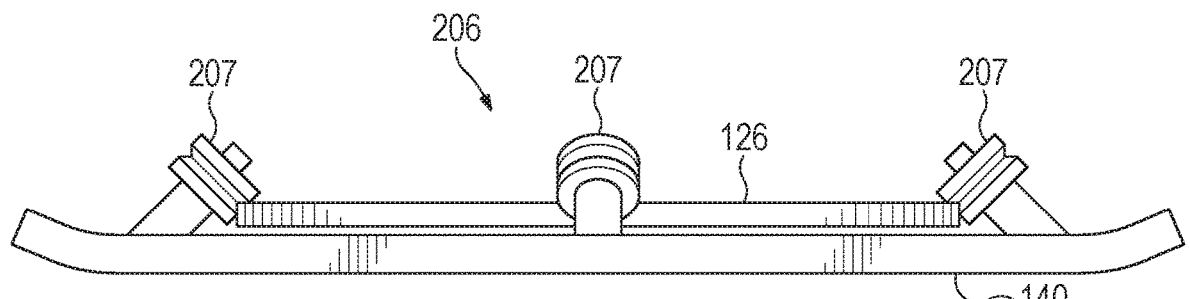
FIG. 9A is a side view of an alternative rotation device for rotating a steering assembly relative to a support foot.
Figure 9B:
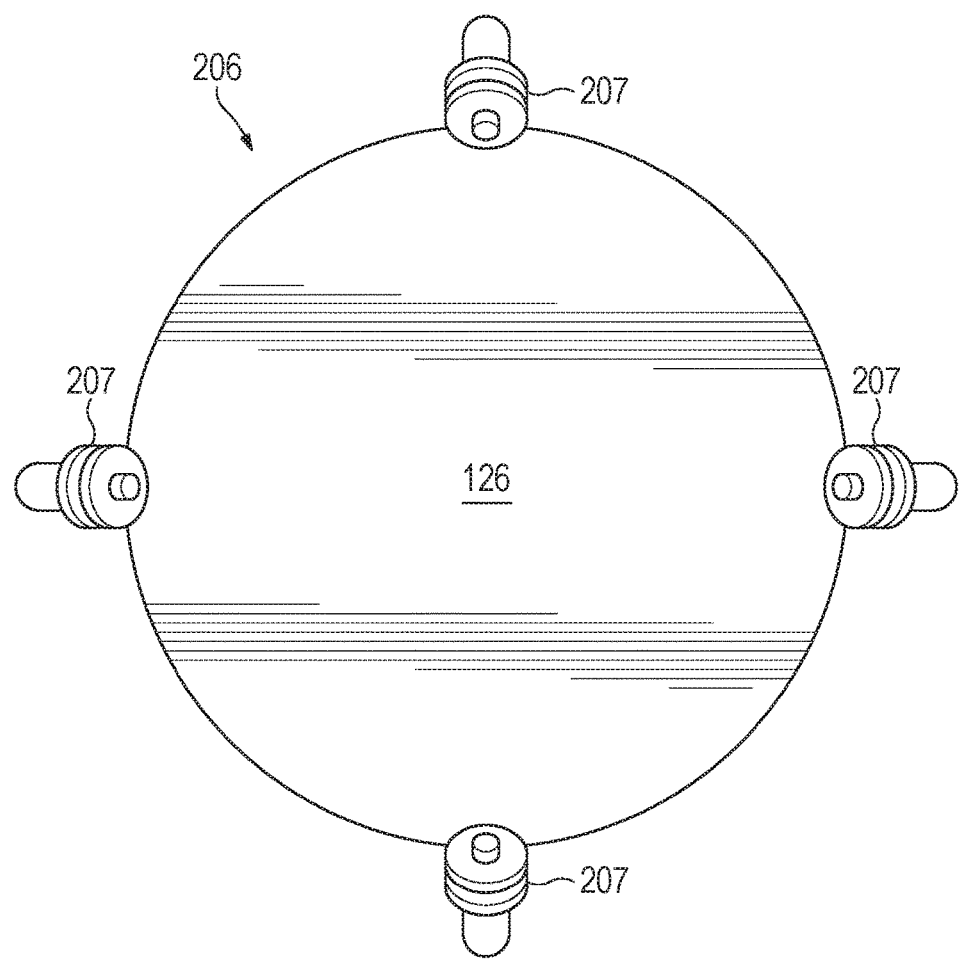
FIG. 9B is a top view of the rotation device in FIG. 9A.

FIG. 9A is an isolated side view and FIG. 9B is an isolated top view of another example rotation device 206. Rotation device 206 may include an inwardly inclining set of rollers 207 that press against a top outer edge of lower main gear 126. Rollers 207 allow main gear 126 to rotate about a vertical axis while also holding main gear 126 in a same vertical and horizontal position on support foot 140.

Figure 10A:
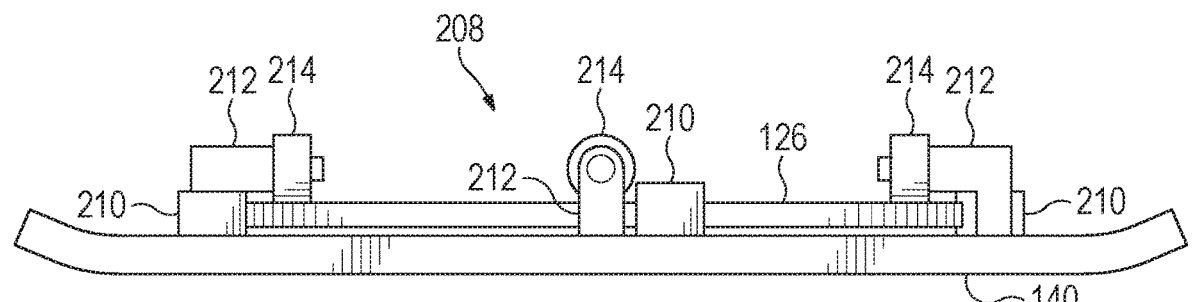
FIG. 10A is a side view of another alternative rotation device for rotating a steering assembly relative to a support foot.
Figure 10B:
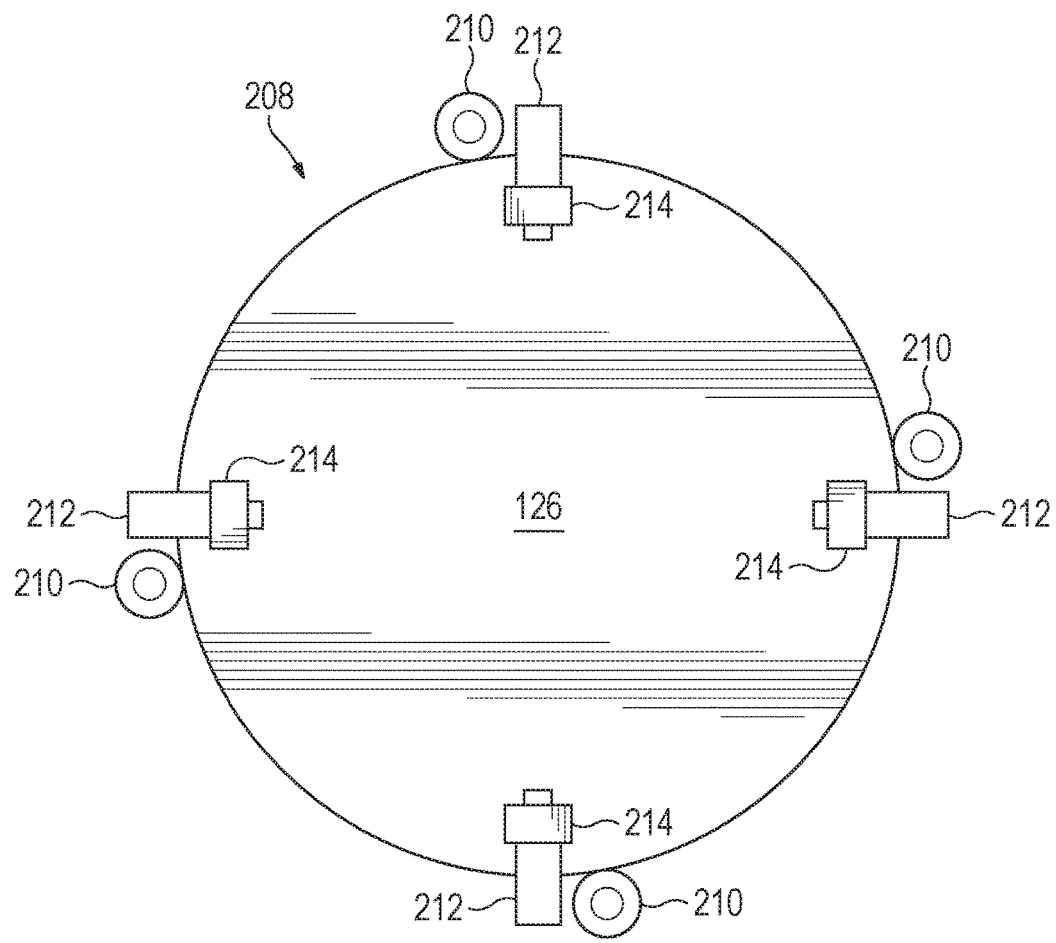
FIG. 10B is a top view of the rotation device in FIG. 9A.

FIG. 10A is an isolated side view and FIG. 10B is an isolated top view of another example rotation device 208. Rotation device 208 may include a first set of rollers 210 that extend vertically up around the outer perimeter of lower main gear 126. A set of arms 212 include first ends that extend vertically up from support foot 140 and second ends that extend transversely from the first ends over the outer circumference of lower main gear 126. A second set of rollers 214 are rotationally attached to the second ends of arms 212 and extend over the top outside periphery of lower main gear 126. Rollers 210 may hold lower main gear 126 in a same longitudinal and lateral position on support foot 140. Rollers 214 may hold lower main gear 126 vertically over support foot 140 when support foot 140 is raised off the ground surface.

Figure 11A:
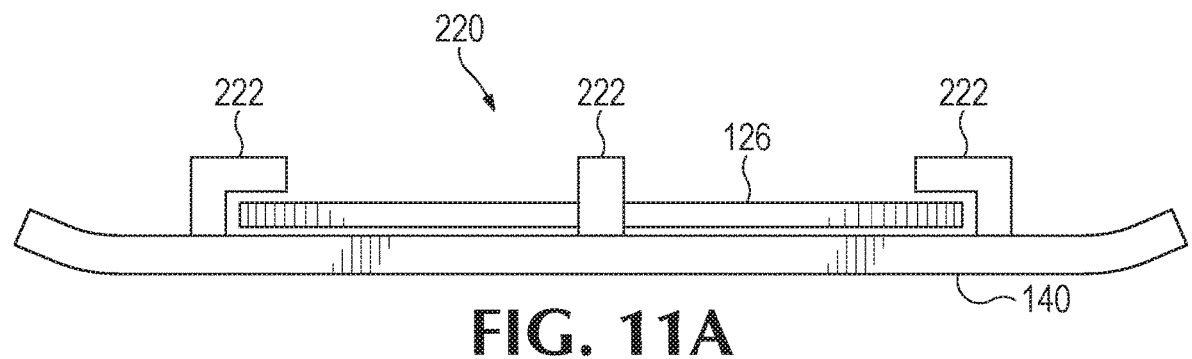
FIG. 11A is a side view of yet another rotation device for rotating a steering assembly relative to a support foot.
Figure 11B:
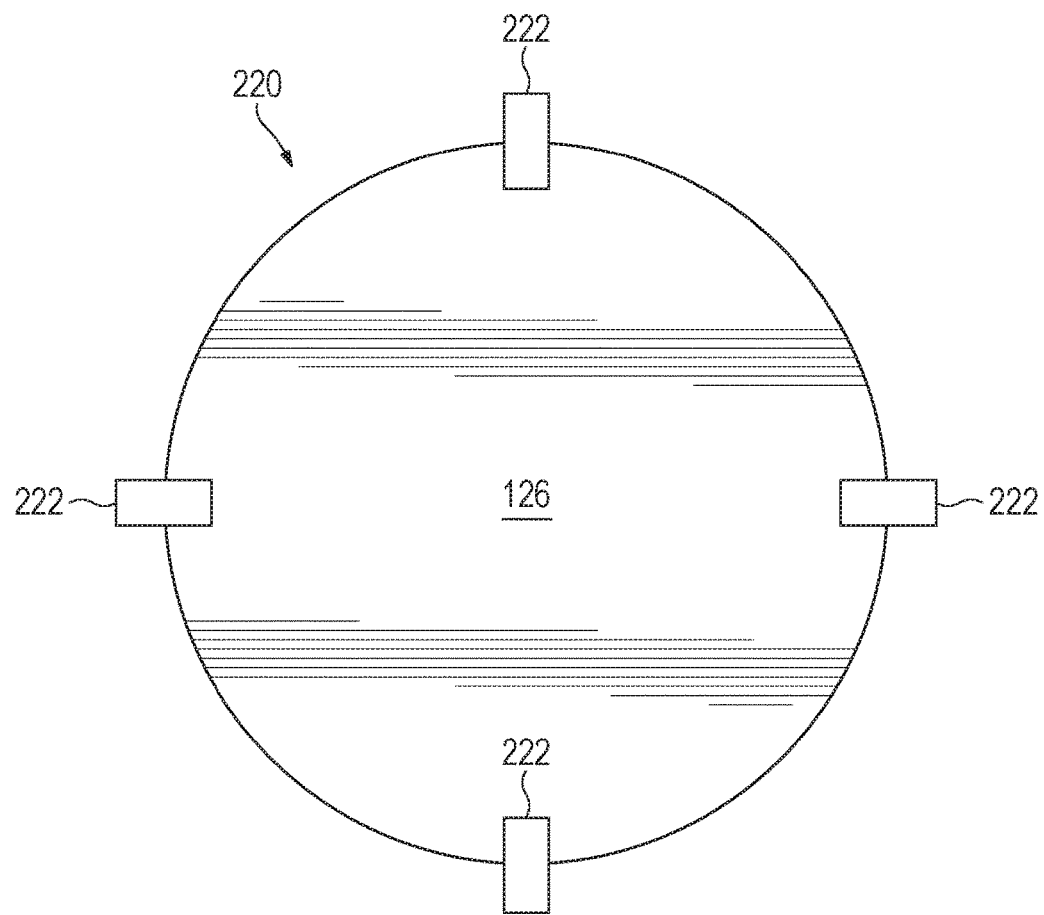
FIG. 11B is a top view of the rotation device in FIG. 10A.

FIG. 11A is an isolated side view and FIG. 11B is an isolated top view of another example rotation device 220. Rotation device 220 may include a set of arms or clips 222 that include first ends that extend vertically up from support foot 140 and second ends that extend transversely from the first ends over the outer circumference of lower main gear 126. Clips 222 hold lower main gear 126 in a same longitudinal and lateral position on support foot 140 and hold lower main gear 126 vertically over support foot 140 when support foot 140 is raised off the ground surface.

Any of the yaw control and alignment systems described above can be used in combination with any of the rotation devices described above, where lower main gear 126 rotates about a vertical axis relative to support foot 140 to change a direction of steering assembly 142 while at the same time maintaining a same yaw position of support foot 140 relative to load bearing frame 150.

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

The invention claimed is:

1. A load transporting apparatus configured to move a load over a base surface, comprising:
    a lift mechanism configured to lift a load transport assembly supporting the load;
    a steering assembly coupled to the lift mechanism and configured to rotate in different directions to displace the load transport assembly;
    a support foot rotationally coupled to the steering assembly; and
    a yaw alignment system coupled between the steering assembly and the support foot configured to create a restoring torque to offset the rotation of the steering assembly and maintain an alignment of the support foot with the load transport assembly;
    wherein the load transporting apparatus further comprises a biasing device coupled to the steering assembly configured to activate based on a yaw change between the load transport assembly and the steering assembly during a step operation and return the steering assembly and support foot back to a pre-step alignment with the load transport assembly when the support foot is lifted off the base surface.

2. The apparatus of claim 1, wherein the yaw alignment system includes:
    a lower assembly located between a steering assembly and a support foot; and
    wherein the lower assembly includes a main rotation device and an additional rotation device engaged with the main rotation device and rotationally coupled to the support foot.

3. The apparatus of claim 1, including a lower locking mechanism locking the support foot lower into a yaw alignment with the steering assembly.

4. A load transporting apparatus configured to move a load over a base surface, comprising:
    a lift mechanism configured to lift a load transport assembly supporting the load;
    a steering assembly coupled to the lift mechanism and configured to rotate in different directions to displace the load transport assembly;
    a support foot rotationally coupled to the steering assembly; and
    a yaw alignment system coupled between the steering assembly and the support foot configured to create a restoring torque to offset the rotation of the steering assembly and maintain an alignment of the support foot with the load transport assembly, wherein the yaw alignment system includes:
        a lower assembly located between the steering assembly and the support foot;
        wherein the lower assembly includes a main rotation device and an additional rotation device engaged with the main rotation device and rotationally coupled to the support foot;

a torque platform coupled to the lift mechanism;
an upper assembly located between the torque platform and the steering assembly, wherein the upper assembly includes a main rotation device and an additional rotation device engaged with the main rotation device of the upper assembly and rotationally coupled to the torque platform.

5. The apparatus of claim 4, including an upper locking mechanism locking the steering assembly into a yaw alignment with the load transport assembly.

6. The apparatus of claim 4, wherein:
the upper assembly includes an upper steering lever attached to the additional rotation device of the upper assembly to rotate the main rotation device of the upper assembly and the steering assembly into a desired steering direction; and
the lower assembly includes a lower steering lever attached to the additional rotation device of the lower assembly to rotate the support foot relative to the steering assembly to maintain the alignment of the support foot with the load transport assembly during the rotation of the steering assembly.

7. The apparatus of claim 4, including:
a first motor attached to the additional rotation device of the upper assembly to rotate the main rotation device of the upper assembly and the steering assembly into a desired steering direction; and
a second motor attached to the additional rotation device of the lower assembly to rotate the support foot relative to the steering assembly to maintain the alignment of the support foot with the load transport assembly during the rotation of the steering assembly.

8. The apparatus of claim 4, including:
a motor;
a rotation assembly coupled to the motor;
a first shape modifiable shaft coupled at a top end to the rotation assembly and coupled at a bottom end to the additional rotation device of the upper assembly to rotate the main rotation device of the upper assembly and the steering assembly into a desired steering direction; and
a second shape modifiable shaft coupled at a top end to the rotation assembly and coupled at a bottom end to the additional rotation device of the lower assembly to rotate the support foot relative to the steering assembly to maintain the alignment of the support foot with the load transport assembly during the rotation of the steering assembly.

9. The apparatus of claim 1, wherein the biasing device comprises an arm coupled at a top end to the load transport assembly and coupled at a bottom end to a torque platform attached to the steering assembly.

10. The apparatus of claim 9, wherein the arm includes:
an upper section including a top end pivotally coupled to the load transport assembly; and
a lower section pivotally coupled at a top end to a bottom end of the upper arm and pivotally coupled at a bottom end to the torque platform.

11. The apparatus of claim 9, wherein the torque platform includes a pattern of holes configured to receive a pin attached to the bottom end of the arm.

12. The apparatus of claim 9, wherein the top end of the arm inserts vertically into a tube that extends down from the load transport assembly.

13. The apparatus of claim 9, wherein the top end of the arm is pivotally coupled inside of a slot formed in a support that extends down from the load transport assembly and the bottom end of the arm is pivotally coupled to the torque platform.

14. The apparatus of claim 2, including arms that extend up from the support foot and over a perimeter of the main rotation device of the lower assembly.

15. The apparatus of claim 2, including rollers rotationally coupled to the support foot and extends over a perimeter of the main rotation device of the lower assembly.

16. A yaw alignment system, comprising:
an alignment assembly coupled between a steering assembly and a support foot configured to maintain an alignment of the support foot with a load transport assembly while rotating the steering assembly in different steering directions;
wherein the yaw alignment system further comprises a biasing device coupled between the load transport assembly and the steering assembly configured to activate in response to a non-linear displacement of the load transport assembly relative to the support foot during a step operation and move the steering assembly and the support foot back into pre-step operation alignments with the load transport assembly.

17. The yaw control system of claim 16, wherein the biasing device is configured to:
extend and retract in response to vertical displacement of the steering assembly; and
twist or deform in response to the non-linear displacement of the load transport assembly relative to the support foot.

18. The yaw control system of claim 16 including a torque plate coupled to the biasing device and the steering assembly.

19. The yaw control system of claim 16, wherein the alignment assembly includes a lower assembly configured to rotate the support foot relative to the steering assembly.

20. The yaw control system of claim 19, wherein the alignment assembly includes a lower locking mechanism configured lock the lower assembly into a fixed yaw alignment with the support foot.

21. The yaw control system of claim 19, wherein the alignment assembly includes an upper assembly configured to rotate the steering assembly relative to the load transport assembly.

22. The yaw control system of claim 21, wherein the alignment assembly includes an upper locking mechanism configured lock the upper assembly into a fixed yaw alignment with the load transport assembly.

23. A yaw alignment system, comprising:
an alignment assembly coupled between a steering assembly and a support foot configured to maintain an alignment of the support foot with a load transport assembly while rotating the steering assembly in different steering directions
wherein the alignment assembly includes a lower assembly configured to rotate the support foot relative to the steering assembly;
wherein the alignment assembly includes an upper assembly configured to rotate the steering assembly relative to the load transport assembly; and
wherein the yaw alignment system further comprises a drive mechanism coupled to the lower assembly and the upper assembly and configured to:
rotate the upper assembly and the steering assembly into the different steering directions; and rotate the lower assembly and the support foot to maintain the same alignment of the support foot with the load transport assembly.

24. A method for steering a walking device, comprising:
rotating a steering assembly of the walking device relative to a load transport assembly into a desired steering direction;
rotating a support foot of the walking device to maintain an alignment of the support foot with the load transport assembly while the steering assembly is rotated into the desired steering direction;
locking the support foot and the steering assembly into a pre-step alignment with the load transport assembly;
biasing a device in response to a non-linear displacement of the load transport assembly relative to the support foot; and
unbiasing the device to rotate the steering assembly and the locked support foot back into the pre-step alignment with the load transport assembly.

25. The method of claim 24, including rotating the steering assembly and the support foot in different directions at the same time to rotate the steering assembly into the desired steering direction and maintain the alignment of the support foot with the load transport assembly.

* * * * *